June 2, 1931.      I. H. RIEKE      1,808,575
SEAL FOR BUNG FIXTURES OF CONTAINERS
Filed Oct. 30, 1929
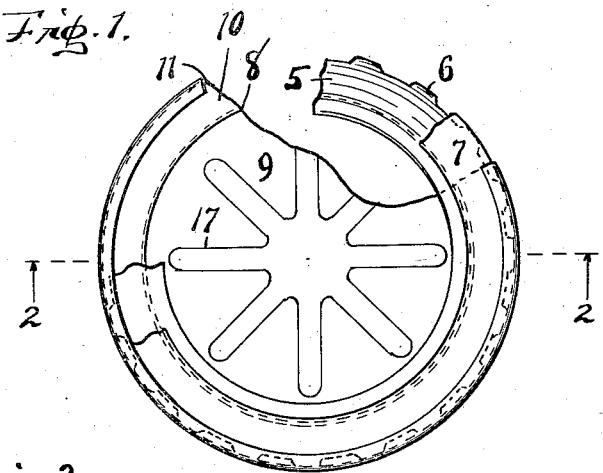
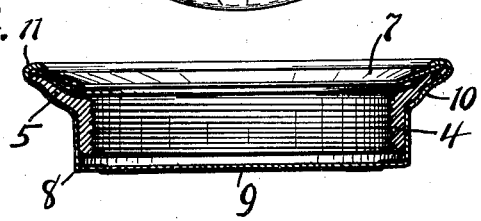
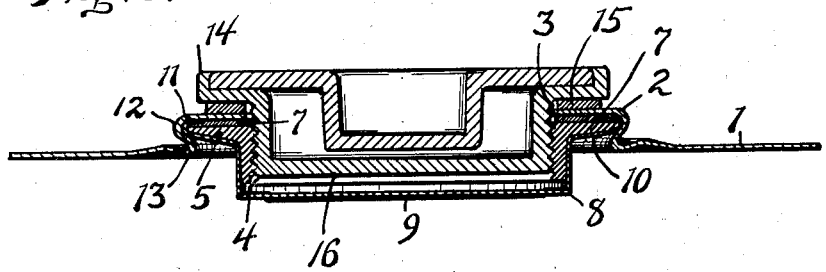
Irvin H. Rieke INVENTOR.
BY
H. G. Burns ATTORNEY.

Patented June 2, 1931

1,808,575

UNITED STATES PATENT OFFICE

IRVIN H. RIEKE, OF AUBURN, INDIANA, ASSIGNOR TO RIEKE METAL PRODUCTS CORPORATION, A CORPORATION OF INDIANA

SEAL FOR BUNG FIXTURES OF CONTAINERS

Application filed October 30, 1929. Serial No. 403,519.

This invention relates to improvements in seals for bung fixtures of containers and is especially applicable to that type of fixture in which a bung ring is secured in an embossment formed in the wall of a sheet metal container about its bung opening.

Among the objects of the invention is the provision of a destructible seal by means of which communication with the interior of a container, through its bung opening, is prevented, independently of the bung by which the bung fixture is closed, whereby upon removal of the bung the seal prevents communication with the interior of the container until purposely broken.

Another object is the provision of a bung ring with a gasket attached thereto and a sealing means therefor for closing one end of the ring so that the ring, gasket and seal are conveniently held together in connected relation with each other preparatory to their installation in the embossment made for their reception in the wall of a container.

A further object is to provide a seal for the bung opening of a container whereby leakage and unauthorized removal of the content of the container through its bung opening without detection are prevented.

An illustrative embodiment of the invention is shown in the accompanying drawings, in which:—

Fig. 1 is a plan view of an assemblage including a bung ring to which a seal and gasket are applied, shown in their initial form preparatory to installment in the container, portions being broken away;

Fig. 2 is a vertical section of Fig. 1 on the line 2—2 thereof; and

Fig. 3 is a vertical section of a bung fixture embodying the invention, installed in the wall of a container, and including also a bung positioned in the ring.

Referring to the drawings there is disclosed the wall 1 of a container, constructed of sheet metal, there being formed in the wall a circular embossment 2 through the top of which is made a bung opening 3.

An internally threaded bung ring 4 is provided which has at its top an external flange 5 having on its outer periphery an annular series of projections 6, the flange 5 being initially formed so as to extend upon an upward incline toward its outer periphery.

Upon the top face of the flange 5 is disposed a gasket 7 of heavy paper, fibre or other suitable material, the external diameter of the gasket being substantially equal to that of the flange 5 of the ring.

A seal 8 is made of thin sheet metal and shaped into the form of a cup, the bottom 9 of which extends across the lower end of the ring so that said ring is closed thereby when the seal is in place. The seal has an outwardly extending flange 10, the upper edge of which is backturned to form an annular pocket 11 into which the outer marginal edges of the flange 5 of the ring and the gasket 7 respectively extend, whereby the seal and the gasket are secured in connection with the ring. The assemblage, consisting of the ring, together with the seal and gasket attached thereto, is installed in the wall 1 of the container by inserting the flanged end thereof into the embossment 2, and then applying force by means of suitable tools (not shown) to the flanged end and to the embossment, so that said end is flattened out and the wall of the embossment is folded around the outer perimeter of said flanged end. The uppermost fold 12 of the embossment 2 envelopes the pocket 11 of the seal, and the lowermost fold 13 of the embossment 2 forms a shoulder that underlies the outer periphery of the flanged end, whereby the ring and seal are firmly held in place in the embossment and the gasket 7 is compressed tightly between the flanged end and the wall of the embossment surrounding the opening 3 therein.

A bung 14 of any suitable structure is screwed into the ring and is provided with a gasket 15 for closing the bung opening in the usual manner, the bung being so proportioned that its lower end 16 does not come into contact with the bottom 9 or head, of the seal when the bung is in closed position, so that the seal is not displaced thereby.

If so desired, the head of the seal may have formed therein a series of beads 17 by means of which the bead is strengthened.

In utilizing the invention, the bung ring being closed by the seal when the ring and the seal are installed in the wall of the container, it is necessary that the initial filling of the container with the material to be shipped therein be made through a separate opening (not shown) provided for that purpose, which separate opening, after the vessel is filled, is permanently closed in any suitable well known manner. The bung is placed in normal position in the ring while the seal is intact, and the filled container is then shipped to its destination. The receiver of the container, upon removing the bung and finding the seal 8 unbroken, is thereby assured that the original contents of the container has been undisturbed. Removal of the contents of the container is dependent upon mutilating the seal by cutting through its head to permit communication with the interior of the container.

As the seal, after its head is cut away, cannot be replaced, or, if mutilated, is extremely difficult to repair without defacement, the act of fraudulently withdrawing the original contents of the container and refilling it with spurious material without detection is prevented.

A feature of the invention is the arrangement of the gasket 7 in connection with the flange 5 of the ring by turning the rim of the seal back over the outer margin of the gasket whereby these parts are held together, which permits their assemblage where manufactured, and affords convenience in their transportation and handling preliminary to their installation by the manufacturer of the containers in which they are utilized.

A further advantage is that upon installation of the assemblage in the embossment, a tight joint is made by the gasket 7 between the seal and the flange 5 of the ring and between said flange and the top of the embossment, whereby leakage of the contents of the container through the bung opening 3 is prevented even though the bung 14 should be loosely applied.

Claims:—

1. In an appliance of the class described, an assemblage, consisting of a bung ring having an external flange at one end, a gasket disposed on the flanged end of the ring, and a seal in the form of a cup into which the end of the ring opposite its flange extends and is closed thereby, said cup having a flange at its top provided with an annular pocket into which the outer marginal portions of the flange of the ring and the gasket extend and by which the assembled parts are initially held together.

2. In an appliance of the class described, a bung ring, a seal in the form of a cup into which one end of the ring extends and is closed thereby, the opposite end of said ring and the top of the cup being secured in the wall of a container concentric with the bung opening therein so that said bung opening may be closed by inserting a bung into said ring through said bung opening without said seal being disturbed thereby; and a gasket applied so that tight joints are formed between the seal and the ring and between the ring and the wall of said embossment.

3. A sealing means for the bung opening of a sheet metal container having an embossment surrounding said opening and formed with a seat, a threaded bung ring having a flange at its upper end, a gasket seated upon the upper face of said flange, a cup shaped seal closing the bottom of said ring and surrounding same and having its top turned inwardly over the outer peripheries of said bung ring and said gasket so as to permanently connect the gasket and the ring and thereby form an unitary assemblage, the inturned end of the seal being engaged within the embossment and the latter having an inwardly extending part which is engaged against the upper face of the gasket, a second gasket engaged with the inturned part of the embossment on the top thereof, and a threaded bung fitting in said bung ring and engaged with the second named gasket.

4. A sealing means for the bung opening of a sheet metal container having an embossment surrounding said opening and formed with a seat, a threaded bung ring having a flange at its upper end, a gasket seated upon the upper face of said flange, a cup shaped seal closing the bottom of said ring and surrounding same and having its top extended inwardly over the periphery of said bung ring and said gasket so as to permanently connect the gasket with the ring and thereby form an unitary assemblage, the inwardly extended end of the seal being engaged in the embossment and the latter having a part which is engaged against said inwardly extending end and against the upper face of the gasket, and a threaded bung fitting in said bung ring.

5. A sealing means for the bung opening of a sheet metal container having an embossment formed with an inwardly extending upper portion surrounding said opening, a threaded bung ring having a radial outwardly extending flange, a gasket overlying said flange, and a seal closing one end of said ring and having its marginal portion extended inwardly over the periphery of said ring and the outer marginal portion of said gasket so as to initially secure the gasket and the ring together and thereby form an unitary assemblage, and so that when the assemblage is secured in said embossment, the inner portion of said gasket forms a tight joint between the flange of the ring and said inwardly extending portion of said embossment.

6. A sealing means for the bung opening of a sheet metal container having an embossment and a bung seat portion formed of its wall concentric with said opening, a bung ring having a threaded bore and an external annular enlargement, a seal extending across the bottom of the ring to seal same and having an annular portion encompassing said enlargement and provided with an inturned edge that extends over said enlargement and terminates thereon at a point spaced from the threaded bore of the ring, and a gasket clamped by said ring against the bottom of said bung seat portion to form a seal therebetween.

In testimony whereof I affix my signature.

IRVIN H. RIEKE.